US010859696B2

United States Patent
Bouzari et al.

(10) Patent No.: US 10,859,696 B2
(45) Date of Patent: Dec. 8, 2020

(54) ROW-COLUMN ADDRESSED 2-D ARRAY WITH A DOUBLE CURVED SURFACE

(71) Applicant: BK Medical Aps, Herlev (DK)

(72) Inventors: Hamed Bouzari, Copenhagen (DK); Simon Holbek, Copenhagen (DK); Jorgen Arendt Jensen, Horsholm (DK); Thomas Lehrmann Christiansen, Copenhagen (DK); Erik Vilain Thomsen, Lynge (DK); Matthias Bo Stuart, Horsholm (DK)

(73) Assignee: B-K Medical ApS, Herlev (DK)

( * ) Notice: Subject to any disclaimer, the term of this patent is extended or adjusted under 35 U.S.C. 154(b) by 0 days.

(21) Appl. No.: 16/307,709

(22) PCT Filed: Jun. 8, 2016

(86) PCT No.: PCT/IB2016/053367
§ 371 (c)(1),
(2) Date: Dec. 6, 2018

(87) PCT Pub. No.: WO2017/212313
PCT Pub. Date: Dec. 14, 2017

(65) Prior Publication Data
US 2019/0302256 A1    Oct. 3, 2019

(51) Int. Cl.
*G01S 15/89* (2006.01)
*G10K 11/30* (2006.01)
(Continued)

(52) U.S. Cl.
CPC ........ *G01S 15/8925* (2013.01); *B06B 1/0622* (2013.01); *G01S 15/892* (2013.01);
(Continued)

(58) Field of Classification Search
CPC ............... G01S 15/892; G01S 15/8929; G01S 15/8913; G01S 15/8925; G10K 11/32; G10K 11/30; G10K 11/34; B06B 1/0622
(Continued)

(56) References Cited

U.S. PATENT DOCUMENTS

| 2008/0045838 A1* | 2/2008 | Hyuga | B06B 1/0622 |
| | | | 600/463 |
| 2008/0221454 A1* | 9/2008 | Davidsen | G01S 7/5208 |
| | | | 600/459 |

(Continued)

FOREIGN PATENT DOCUMENTS

| GB | 2494013 | * | 2/2013 |
| WO | WO2017017801 | * | 2/2017 |

OTHER PUBLICATIONS

International Search Report for PCT/IB2016/053367 published as WO2017/212313 A1 dated Dec. 14, 2017.
(Continued)

*Primary Examiner* — Jacques M Saint Surin
(74) *Attorney, Agent, or Firm* — Anthony M. Del Zoppo, III; Daugherty & Del Zoppo Co., LPA

(57) ABSTRACT

A transducer array (302) for an ultrasound imaging system (300) includes a row-column addressed 2-D array of transducer elements (304). The row-column addressed 2-D includes a first array of 1-D arrays of elements, a second array of 1-D arrays of elements, which is orthogonal to the first array, and a double-curved surface (306). In another aspect, an apparatus includes a transducer array with an array-wise addressable 2-D array with a curved surface. The 2-D array includes a set of 1-D column array elements and a set of 1-D row array elements. The apparatus further includes transmit circuitry (308) that conveys an excitation pulse to the transducer array, receive circuitry (308) that receives a signal indicative of an ultrasound echo from the
(Continued)

transducer array, and a beamformer (314) that processes the received signal, generating ultrasound image data.

20 Claims, 11 Drawing Sheets

(51) Int. Cl.
    *G10K 11/34*     (2006.01)
    *G10K 11/32*     (2006.01)
    *B06B 1/06*     (2006.01)

(52) U.S. Cl.
    CPC ...... *G01S 15/8913* (2013.01); *G01S 15/8929* (2013.01); *G10K 11/30* (2013.01); *G10K 11/32* (2013.01); *G10K 11/34* (2013.01)

(58) Field of Classification Search
    USPC .......................................................... 73/641
    See application file for complete search history.

(56) References Cited

U.S. PATENT DOCUMENTS

2012/0029393 A1     2/2012     Lee
2013/0060141 A1*   3/2013   Sinelnikov ........... A61B 8/4488
                                                                 600/439
2015/0023135 A1*   1/2015   Yuchi .................. G01S 15/8993
                                                                   367/7
2015/0183634 A1*   7/2015   Wang ................... B06B 1/0292
                                                                   73/643
2018/0348624 A1*  12/2018   Jensen ................. G01S 7/5202
2020/0064468 A1*   2/2020   Holbek ............... G01S 15/8997

OTHER PUBLICATIONS

Demore, C.E.M, et al., Real-Time Volume Imaging Using a Crossed Electrode Array, IEEE Transactions on Ultrasonics Ferroelectrics, and Frequency Control, vol. 56, No. 6, Jun. 2009.

Rasmussen Morten Fischer, et al., 3-D Imaging Using Row-Column-Addressed Arrays with Integrated Apodization—Part I: Apodization Design and Line Element Beamforming, IEEE Transactions on Ultrasonics Ferroelectrics, and Frequency Control, vol. 62, No. 5, pp. 947-958, XP011581108, May 1, 2015.

Joyce Andrew W., et al., Crossed-Array Transducer for Real-Time 3D Imaging, IEEE International Ultrasonics Symposium, pp. 2116-2120, XP032667061, Sep. 3, 2014.

\* cited by examiner

ROW-COLUMN ADDRESSED 2-D ARRAY WITH A DOUBLE CURVED SURFACE

RELATED APPLICATION

This application is a national filing of PCT application Serial No. PCT/IB2016/053367, filed Jun. 8, 2016, published as WO2017/212313 on Dec. 14, 2017. This application claims priority to PCT application Serial No. PCT/IB2016/053367, published as WO2017/212313 on Dec. 14, 2017.

TECHNICAL FIELD

The following generally relates to ultrasound imaging and more particularly to a row-column addressed 2-D with a double curved surface and/or 3-D imaging with the row-column addressed 2-D with the double curved surface.

BACKGROUND

An ultrasound imaging system includes a transducer array, which includes a one-dimensional (1-D) or a two-dimensional (2-D) array of transducing elements. For three dimensional (3-D) imaging with a 2-D array, the elements can be individually addressed or group-wise addressed using row-column addressing where the elements are accessed by their row or column index, and each row and column in the array thereby acts as one large element. With individual addressing, an N×N array would require $N^2$ electrical connections and channels to fully address the array. As a result, 2-D arrays in the medical environment have been small with small fields of view, which are not well-suited for applications such as abdominal, breast, vascular, etc. examinations. With row-column addressing, the N×N array would require only 2N electrical connections and channels to fully address the array.

FIG. 1 schematically illustrates an example 6×6 flat array 102 configured for row-column addressing. Each column 106 includes an electrically conductive trace or path 108 in electrical communication with each element 104 of the column 106. The column 106 also includes an electrode 110, in electrical communication with the electrically conductive trace or path 108, which is used to excite the column 106. Each row 112 includes an electrically conductive trace or path 114 in electrical communication with the elements 104 of the row 112. The row 112 also includes an electrode 116, in electrical communication with the electrically conductive trace or path 114, which is used to excite the row 112. The row-column addressing of the array 102 effectively transforms the 36-element 2-D array into a 6-element 1-D flat column array 118 and a 6-element 1-D flat row array 120.

For 3-D imaging, one of the 1-D arrays transmits waves into an object under evaluation and the other 1-D arrays receives echoes scattered from the insonified region. Both of the 1-D arrays can be focused in the lateral and elevation directions separately, and each of the 1-D arrays can electronically focus in one lateral dimension when delays are applied to the elements in the array. For example, the 1-D array 118 is able to focus the beam in x- and z-directions, but not in a y-direction. As a result, the emitted ultrasound is focused along a line segment or arc parallel to the y-direction. By adjusting the delays on the transmit elements, this focal line may be translated to any position in the xz-plane. The 1-D array 120 receives the echoes, and by applying delays, the received signals can be focused in a line segment or arc normal to any position in the yz-plane.

The 2-D array 102 can be used for phased array imaging. However, due to the 1-D arrays being flat, when transmitting plane waves, only a rectilinear forward-looking volume region can be imaged. Although it is possible to focus the ultrasound wavefronts curvilinearly, the pulse-echo field is limited only to a forward-looking volume region. This can be seen in FIG. 2, which shows the transmit and receive pressure fields 202 and 204 when steering the transmit and receive beams by ±45° with a same radial distance. The imaging area is the intersection of these two fields, which, unfortunately, is limited to a rectilinear forward-looking boxed-shaped region 206 in front of the transducer 102. Furthermore, it is only possible to use each 1-D flat array either in transmit or receive focusing to jointly target a single point in 3-D space.

SUMMARY

Aspects of the application address the above matters, and others.

In one aspect, a transducer array for an ultrasound imaging system includes a row-column addressed 2-D array of transducer elements. The row-column addressed 2-D includes a first array of 1-D arrays of elements, a second array of 1-D arrays of elements, which is orthogonal to the first array, and a double-curved surface.

In another aspect, an apparatus includes a transducer array with an array-wise addressable 2-D array with a curved surface. The 2-D array includes a set of 1-D column array elements and a set of 1-D row array elements. The apparatus further includes transmit circuitry that conveys an excitation pulse to the transducer array, receive circuitry that receives a signal indicative of an ultrasound echo from the transducer array, and a beamformer that processes the received signal, generating ultrasound image data.

In another aspect, a method includes transmitting an ultrasound signal with 2-D row-column addressed transducer array with a curved surface, transmitting an echo signal with the 2-D row-column addressed transducer array with a curved surface, beamforming the echo signal to create an image, and displaying the image.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which.

DETAILED DESCRIPTION

Figure 3:
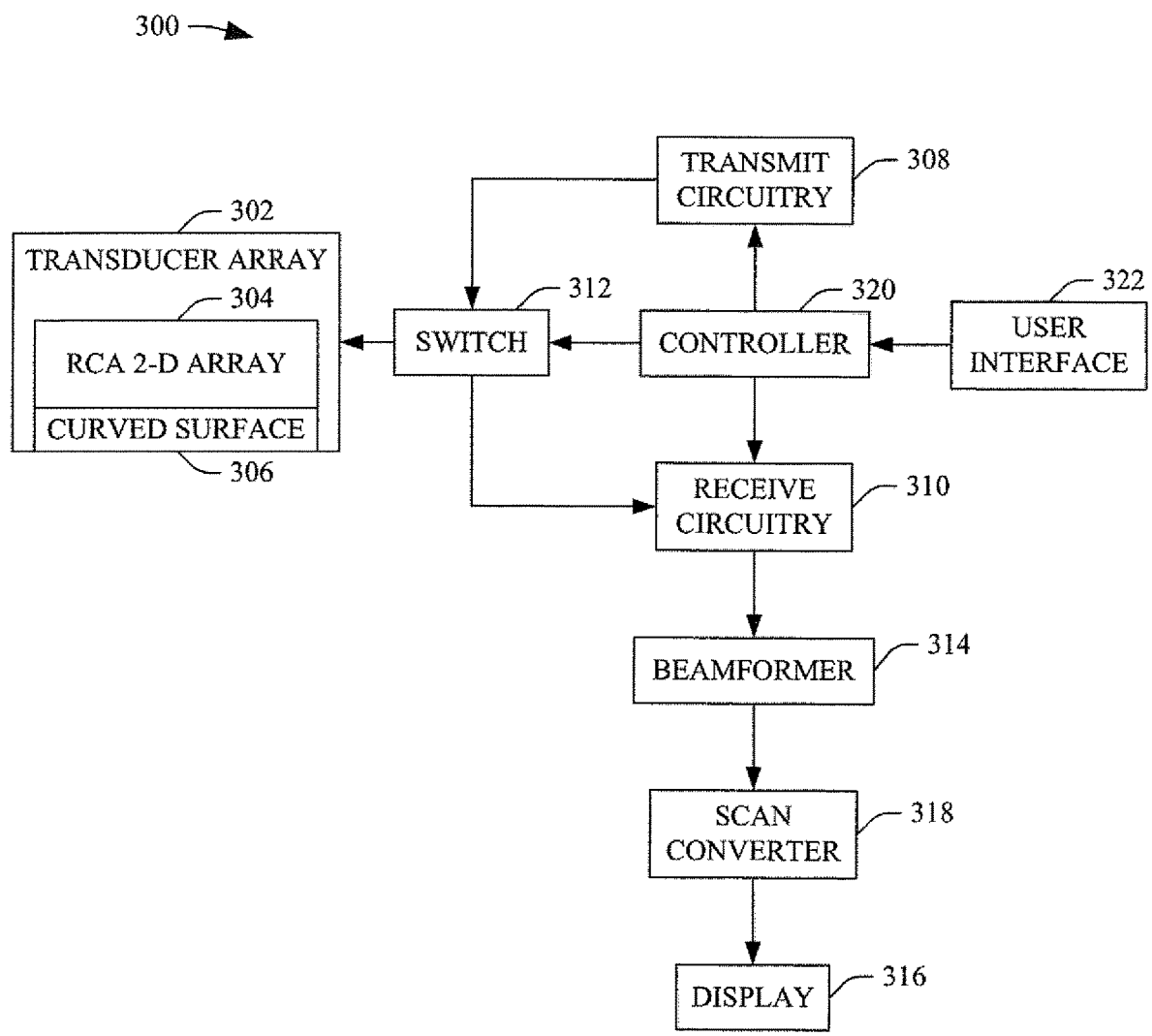
FIG. 3 schematically illustrates an example ultrasound imaging system with a row-column addressed transducer array with a curved surface.

FIG. 3 schematically illustrates an example ultrasound imaging system 300. The ultrasound imaging system 300 includes a 2-D transducer array 302 configured for row-column addressing. The 2-D array 302 include a plurality of detector elements arranged in a N×M matrix of N rows and M columns, where N and M are positive integers and N=M or N≠M (e.g., N>M or N<M). Examples of square arrays include 64×64, 192×192, 256×256, 512×512 and/or other arrays, including larger and/or smaller arrays. Examples also include non-square arrays such as rectangular, circular, irregular and/or other shaped arrays. The elements can be piezoelectric (PZT), capacitive micromachined ultrasonic transducer (CMUT) elements, and/or other transducing elements.

Figure 4:
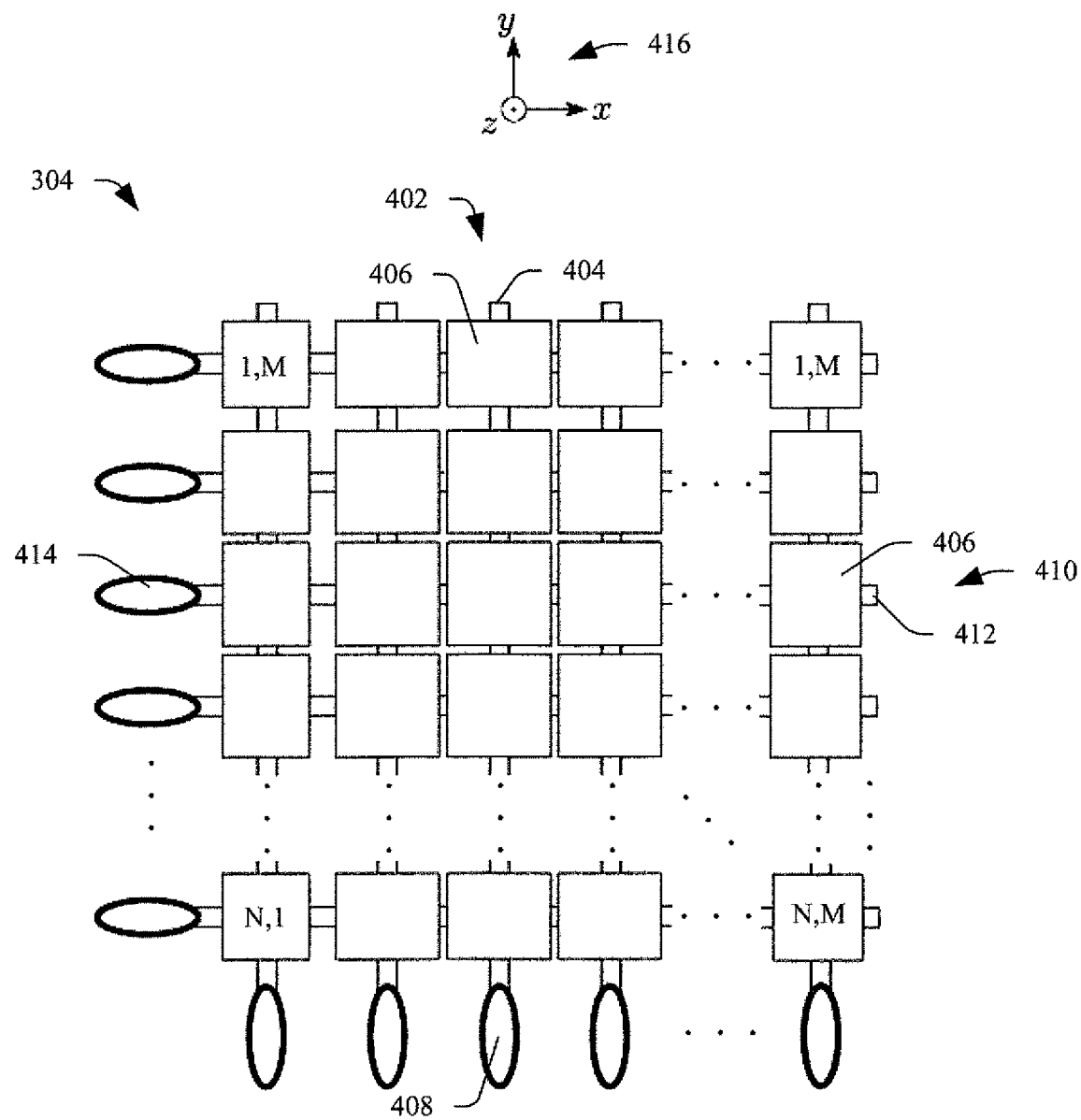
FIG. 4 schematically illustrates an example row-column addressed transducer array for the configuration of FIG. 3.

FIG. 4 schematically illustrates a non-limiting example of the row-column addressed array 304. Each column 402 includes an electrically conductive trace or path 404 in electrical communication with the elements 404 of the column 402. The column 402 also includes an electrode 408, in electrical communication with the electrically conductive trace or path 404, which is used to excite the column 104. Each row 410 includes an electrically conductive trace or path 412 in electrical communication with the elements 406 of the row 410. The row 410 also includes an electrode 414, in electrical communication with the electrically conductive trace or path 412, which is used to excite the row 110.

Either the rows 410 or the columns 402 transmit while the other receives. In this example, the elements 406 of the column 402 are arranged in a first or "y" direction of an "x-y" plane, and the elements 406 of the row 410 are arranged in a second or "x" direction of the "x-y" plane. The elements 406 of the column 402 are configured to transmit, in response to being excited with an electrical pulse, a pressure wave in a "z-x" plane, and the elements 406 of the rows 410 are configured to receive echoes, produced in response to the transmitted pressure wave interacting with matter, in a "z-y" plane. In this example, "x," "y," and "z" are axes of the Cartesian coordinate system 416.

Figure 5:
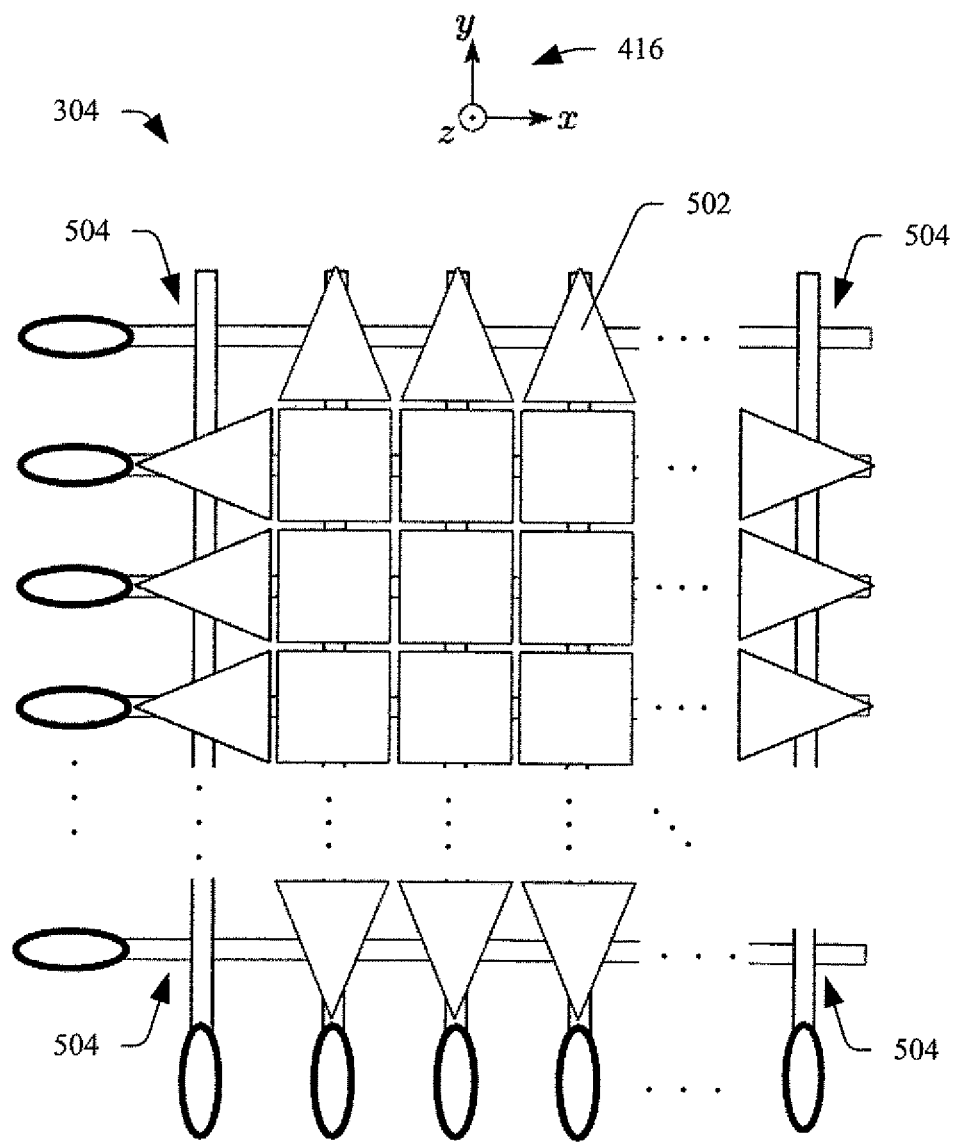
FIG. 5 schematically illustrates another example row-column addressed transducer array for the configuration of FIG. 3.

A geometry of the elements 406 in FIG. 4 are square and/or rectangular. FIG. 5 schematically illustrates a variation of FIG. 4 in which a geometry of outer or perimeter elements 502 are not square and/or rectangular, and elements at corners 504 are omitted. The triangular elements 502 provide integrated apodization that linearly scales (rather than discretely scales, as shown in FIG. 4) the output pressure transmitted by (during transmit) and the electrical signal generated by (during receive) of the elements of the periphery. The illustrated apodization decreases in a direction towards the periphery and away from the center region. Other geometries (e.g., hexagon, circle, etc.) are also contemplated herein.

The examples discussed in connection with FIGS. 4 and 5 and/or other examples of row-column addressed 2-D arrays are described in international application serial number PCT/IB2013/002838, filed on Dec. 20, 2013, and entitled "Ultrasound Imaging Transducer Array with Integrated Apodization," the entirety of which is incorporated herein by reference. An example in international application PCT/IB2013/002838 includes PZT transducer elements. Another example in international application PCT/IB2013/002838 includes CMUT elements. Other configurations of the row-column addressed 2-D array 102 are also contemplated herein.

Returning to FIG. 3, the transducer array 302 further includes a curved surface 306. In one instance, the curved surface 306 is a diverging lens disposed in front of an active transducing surface of the 2-D array 304. In another instance, the curved surface 306 is the active transducing surface of the 2-D array 304. In yet another instance, the curved surface 306 is a combination of the diverging lens and the active transducing surface. As described in greater detail below, the curved surface 306 disperses the transmit and receive fields so that they overlap in an area that is larger than the forward-looking volume region of the 2-D array 304. Also described in greater detail below, the curved surface 306 allows for two-way focusing by focusing at any point in the 3-D space both in transmit and in receive separately. As a result, at least two elements are enough to image a whole curvilinear volume.

Transmit circuitry 308 generates pulses that excite a predetermined set of the addressed columns (or rows) to emit one or more ultrasound beams or waves. Receive circuitry 310 receives signals indicative echoes or reflected waves, which are generated in response to the transmitted ultrasound beam or wave interacting with (stationary and/or flowing), from a predetermined set of addressed rows (or columns). The receive circuitry 310 may also pre-process and/or condition the received signals, e.g., by amplifying, digitizing, etc. the signals. A switch 312 switches between the transmit circuitry 308 and the receive circuitry 310, depending on whether the transducer array 302 is in transmit or receive mode.

A beamformer 312 processes the received echoes, for example, by applying time delays and weights, summing, and/or otherwise processing the received echoes. Alternatively, the beamformer 312 can process the received echoes by applying spatial matched filtering to focus the RF-data at any time and location in space. An example of this is described in Jensen, & Gori. (2001), "Spatial filters for focusing ultrasound images," 2, 1507-1511 vol. 2. doi: 10.1109/ULTSYM.

A display 316 is configured to visually display images and/or other information. A scan converter 318 scan converts the beamformed data, converting the beamformed data (e.g., images or volumes) into the coordinate system of the display 316, which visually displays the images. In one instance, the data is visually displayed in an interactive graphical user interface (GUI), which allows the user to selectively rotate, scale, and/or manipulate the displayed data through a mouse, a keyboard, touch-screen controls, etc.

A controller 320 controls one or more of the components of the system 300 such as at least one of the transmit circuitry 308 or receive circuitry 310, the switch 312, and the beamformer 314. Such control can be based on the mode of operation (e.g., B-mode, etc.) of the system 300 and/or otherwise. A user interface 322 includes an input device (e.g., a physical control, a touch-sensitive surface, etc.) and/or an output device (e.g., a display screen, etc.). A mode, scanning, and/or other function can be activated by a signal indicative of input from the user interface 322.

In one instance, the transducer array 302 is part of a probe and the transmit circuitry 308, the receive circuitry 310, the switch 312, the beamformer 314, the scan converter 318, the controller 320, the user interface 322, and the display 816 are part of a console. Communication there between can be through a wired (e.g., a cable and electro-mechanical interfaces) and/or wireless communication channel. In this instance, the console can be a portable computer such as a laptop, a notebook, etc., with additional hardware and/or software for ultrasound imaging. The console can be docked to a docketing station and used.

Alternatively, the console can be part (fixed or removable) of a mobile or portable cart system with wheels, casters, rollers, or the like, which can be moved around. In this instance, the display 316 may be separate from the console and connected thereto through a wired and/or wireless communication channel. Where the cart includes a docking interface, the console can be interfaced with the cart and used. An example of such a system is described in US publication 2011/0118562 A1, entitled "Portable ultrasound scanner," and filed on Nov. 17, 2009, which is incorporated herein in its entirety by reference.

Alternatively, the transducer array 302, the transmit circuitry 308, the receive circuitry 310, the switch 312, the beamformer 314, the scan converter 318, the controller 320, the user interface 322, and the display 316 are all housed by and enclosed within a hand-held ultrasound apparatus, with a housing that mechanically supports and/or shields the components within. In this instance, the 2-D array 304 is structurally integrated as part of the housing. An example of a hand-held device is described in U.S. Pat. No. 7,699,776, entitled "Intuitive Ultrasonic Imaging System and Related Method Thereof," and filed on Mar. 6, 2003, which is incorporated herein in its entirety by reference.

Figure 6:
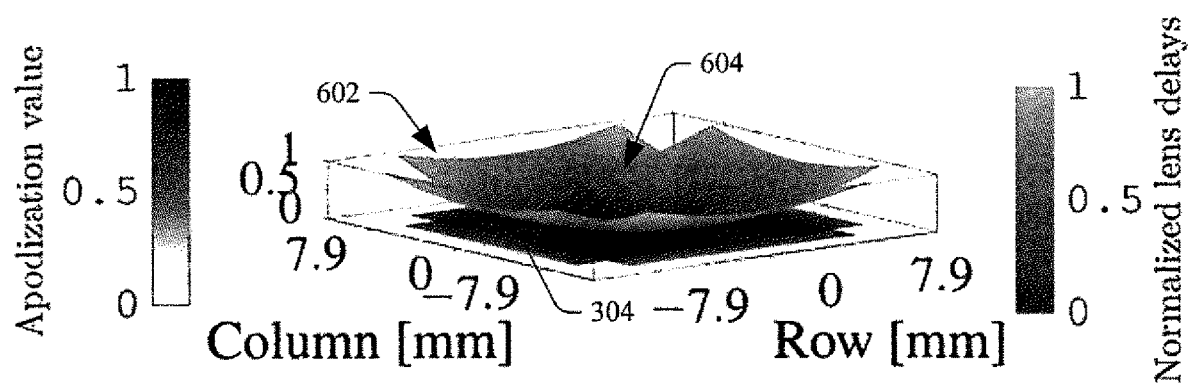
FIG. 6 schematically illustrates an example of the curved surface of the row-column addressed transducer array.

As briefly discussed above, the transducer array 302 includes the curved surface 306. FIG. 6 illustrates a representation of the curved surface 306 in connection with the row-column addressed 2-D array 304 of FIG. 5. However, it is to be understood that the curved surface 306 can be employed with the row-column addressed 2-D array 304 of FIG. 4 and/or other row-column addressed 2-D array. As discussed herein, the curved surface 306 can be a diverging lens disposed adjacent to the transmitting/receiving side of the row-column addressed 2-D array. Examples of suitable lenses include a spherical, cylindrical, Fresnel, and/or other lens. In a variation, the curved surface 306 is the active transducing surface of the 2-D array 304. The curved surface 306 may or may not have integrated apodization.

The illustrated curved surface 306 is a double-curved (i.e., curved in the x-z and y-z planes) convex surface. In one instance, the curvature is the same in the x-z and x-y planes. In another instance, the curvature is different in the x-z and x-y planes. The curved surface 306 has a first thickness at peripheral region 602 and a second thickness at a center region 604, where the first thickness is greater than the second thickness. The thickness of a region controls the delay provided by that region and hence the divergence.

A non-limiting example of suitable thicknesses includes a thickness in a range of 0 to 5 mm for a lens with f #=−0.7 and a speed of sound of 1400 m/s, which corresponds to a delay range of 0 to 3.5 µs. The f # is defined as a ratio between a focal distance to a diameter of the lens. A non-limiting example of a suitable material of the curved surface 306 is Sylgard® 170 (PDMS) with a density of 1000 kg/m$^3$ and a speed of sound of 1400 m/s and attenuation of 3.7 dB/cm·MHz. Sylgard® 170 is a product of Dow Corning Corporation, MI, USA. The curved surface 306 can be disposed centered over the 2-D array 304 or disposed off-center, e.g., at a corner region.

Figure 7:
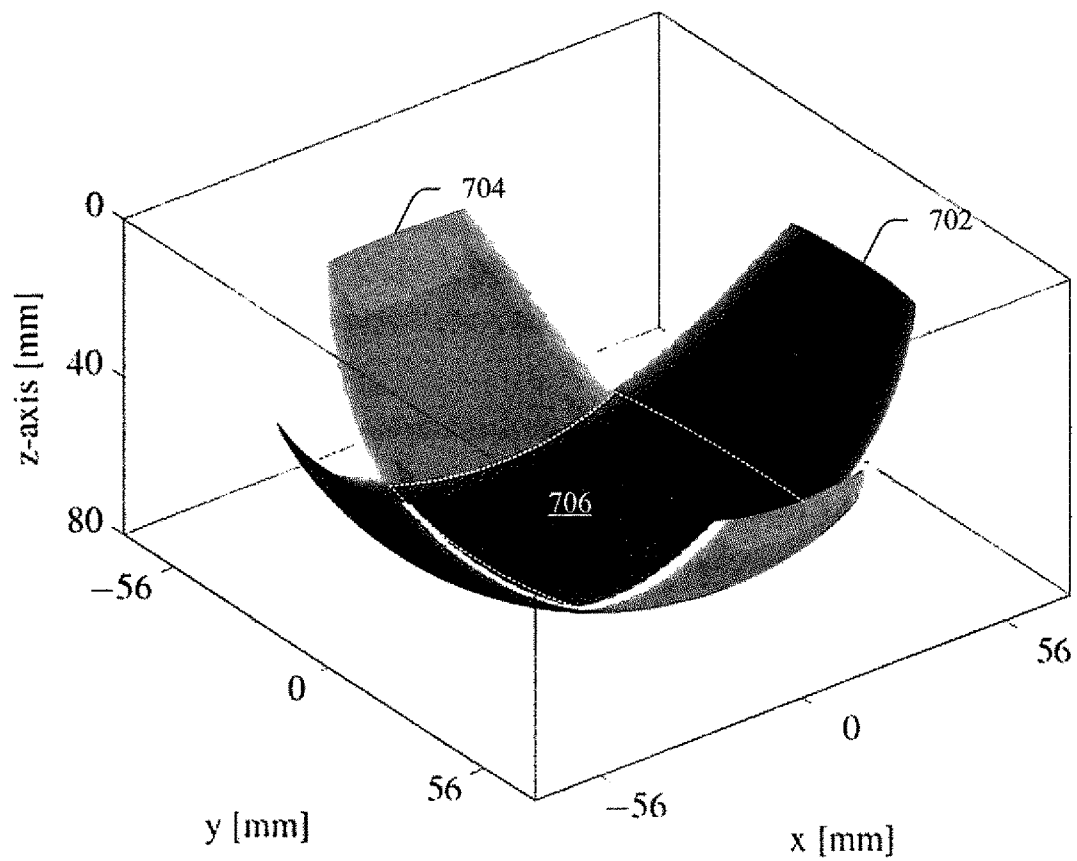
FIG. 7 schematically illustrates a field of view for the row-column addressed transducer array with the curved surface.

The curved surface 306 disperses the transmit and receive fields so that they overlap in a larger area relative to the forward-looking region of the 2-D array 304. Generally, for the flat 2-D array 102 of FIG. 1, each line element produces a cylindrical wave in one direction and a plane wave in the other direction, which restricts the width in the other direction to a line segment having the width of the element. In contrast, the curved surface 306 produces a spherical wave, which originates from a virtual point source, located behind the array, which propagates in a larger field of view. This can be seen by comparing FIGS. 2 and 7. In FIG. 2, the transmit and receive pressure fields 202 and 204 intersect and provide the rectilinear forward-looking region 206. In FIG. 7, diverging transmit and receive pressure fields 702 and 704 intersect and provide a larger intersecting and thus larger imaging region 706, which is larger than the rectilinear forward-looking region 206 of FIG. 2. In the example of FIG. 7, the overlapped transmit and receive region 706, compared to FIG. 2, increases to ±26.5° in both directions.

Figure 1:
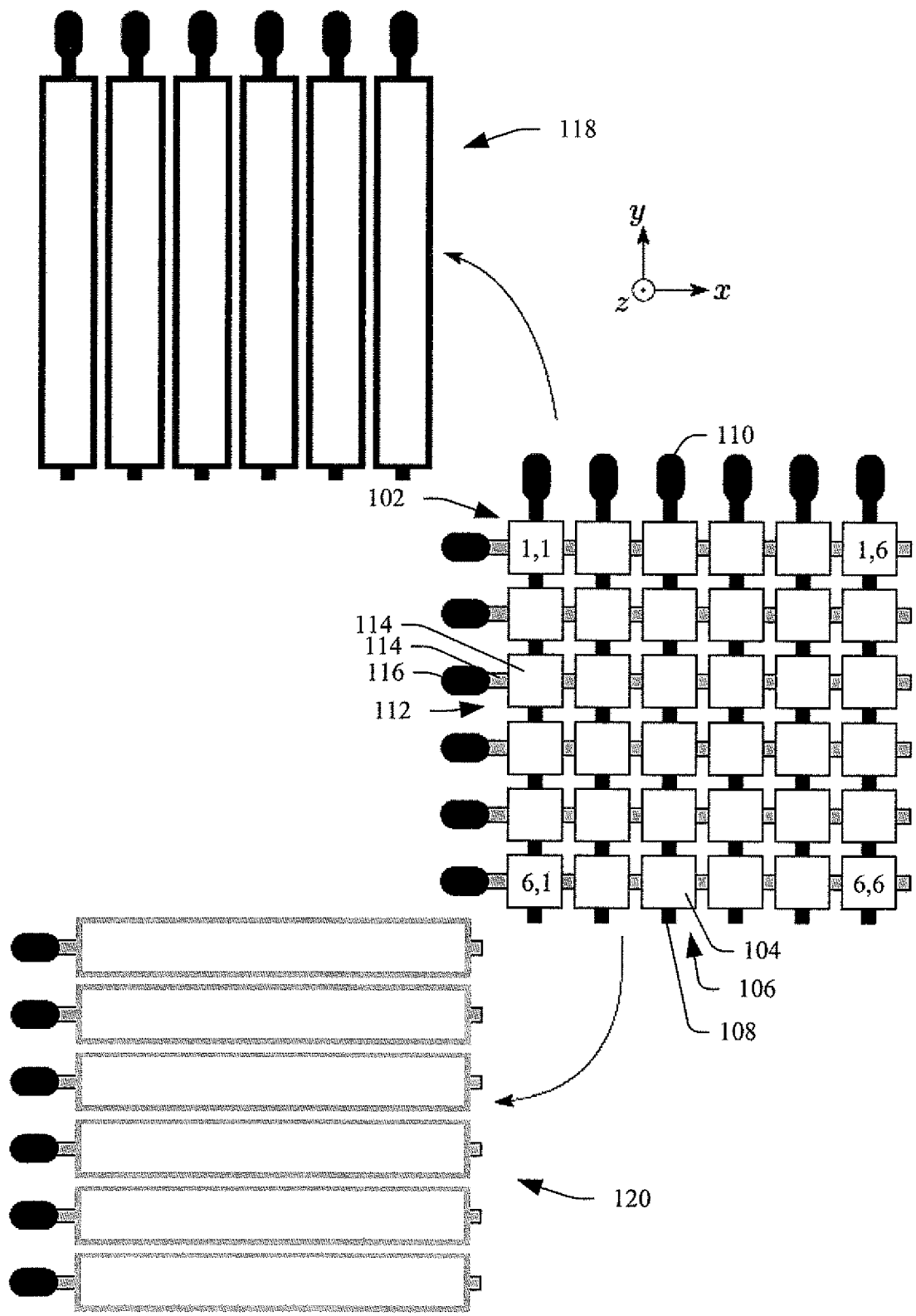
FIG. 1 schematically illustrates a 2-D array configured for row-column addressing.
Figure 2:
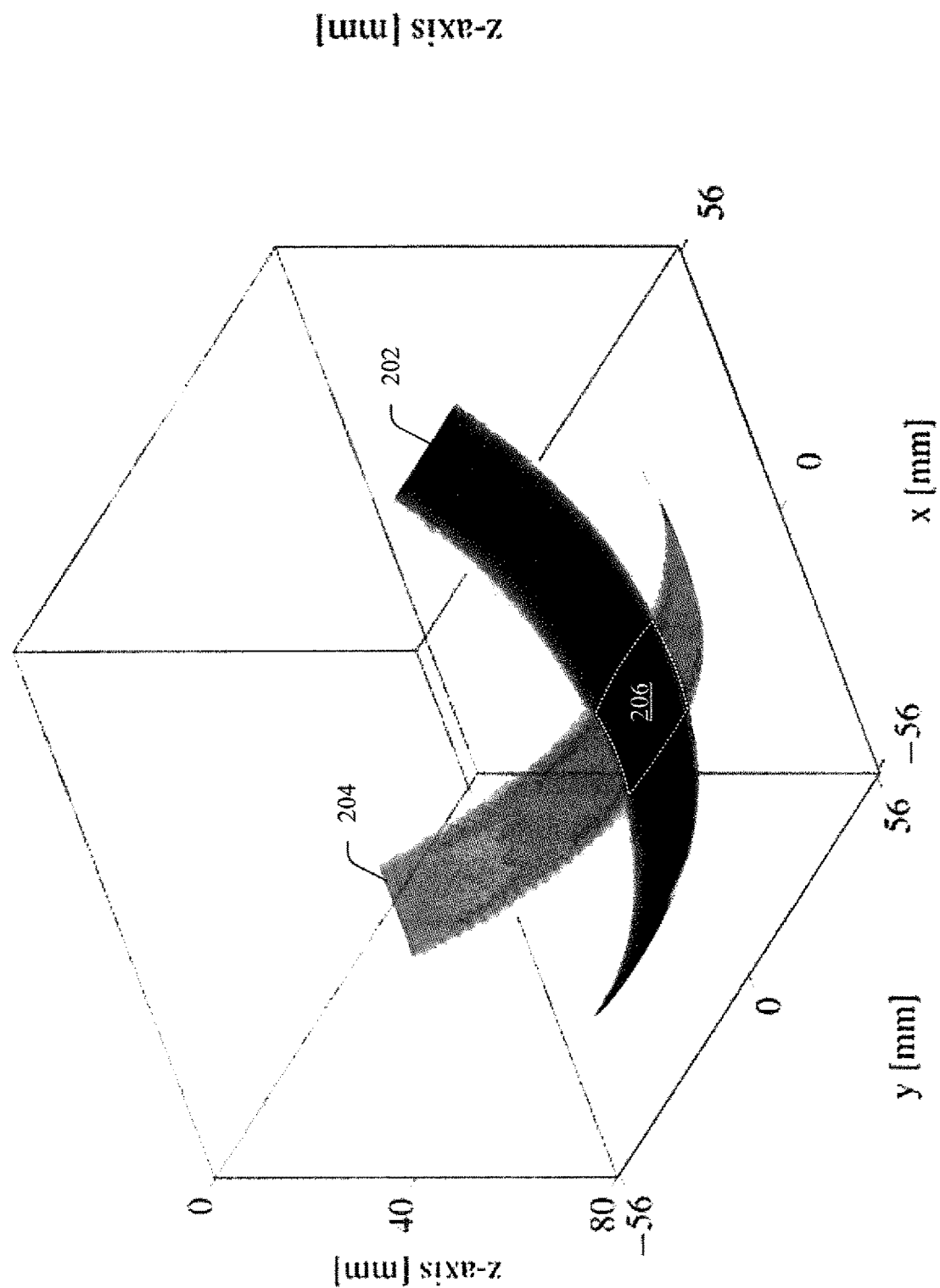
FIG. 2 schematically illustrates a rectilinear forward-looking imaging region of the prior art 2-D array of FIG. 1.
Figure 8:
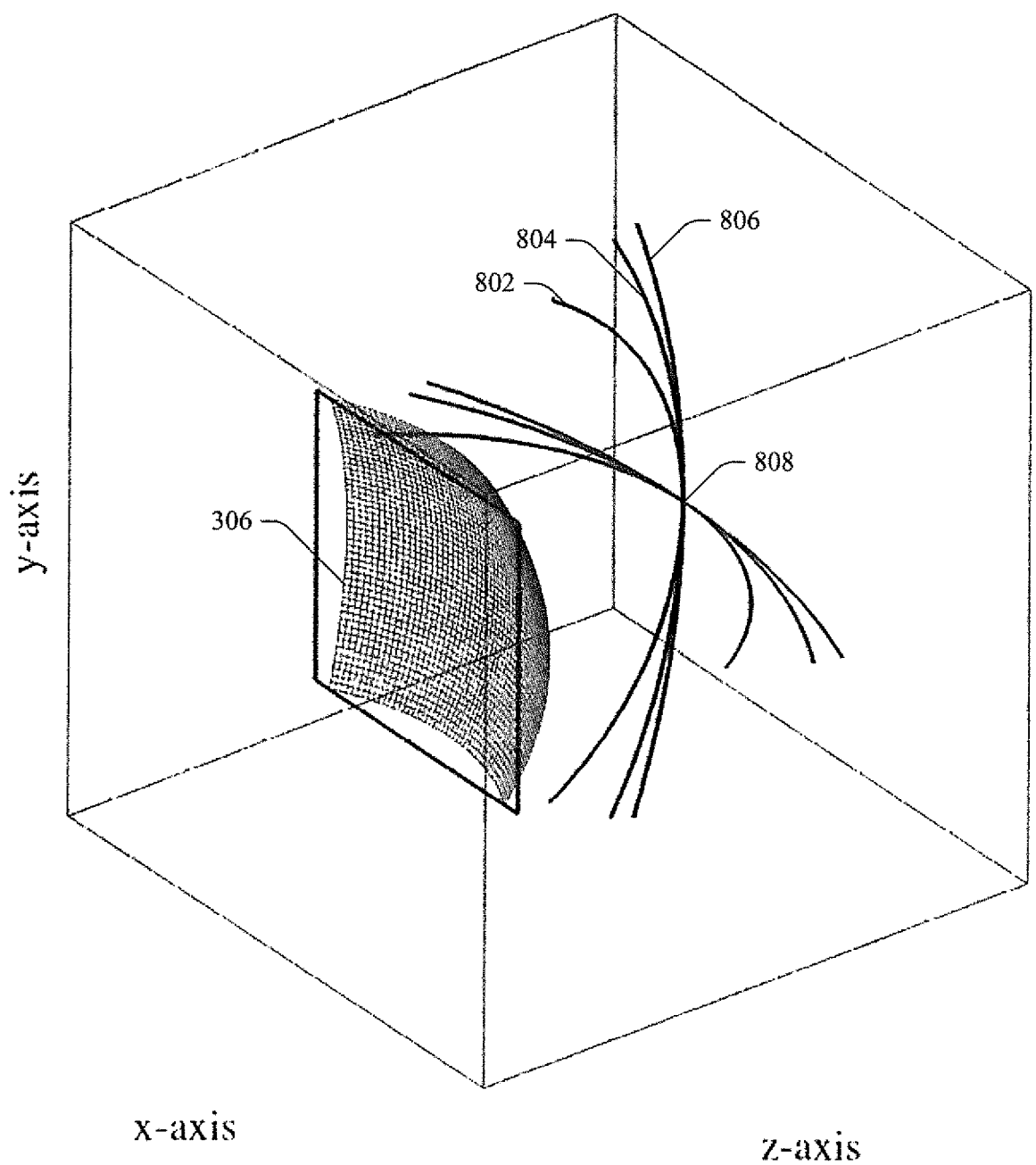
FIG. 8 shows the intersection of transmitted wavefronts with the row-column addressed transducer array with the curved surface is a point.

With the 2-D flat array 102 of FIG. 1, the intersection of transmitted wavefronts has a shape of a line segment. With the configuration shown in FIGS. 3 and 6, with the curved surface 306, the intersection of the transmitted wavefronts is not a line segment but a point. This can be seen in FIG. 8, which shows how the intersection of multiple wavefronts creates a curved line instead of a straight line. Each curved line 802, 804 and 806 is an intersection of two spherical wavefronts. Depending on a distance of each element to a focusing point, each wavefront has a different curvature and therefore all the wavefronts contact at only one point 808. With the 2-D flat array 102 of FIG. 1, focusing is not possible in the orthogonal plane to the transmit steering direction.

Figure 9:
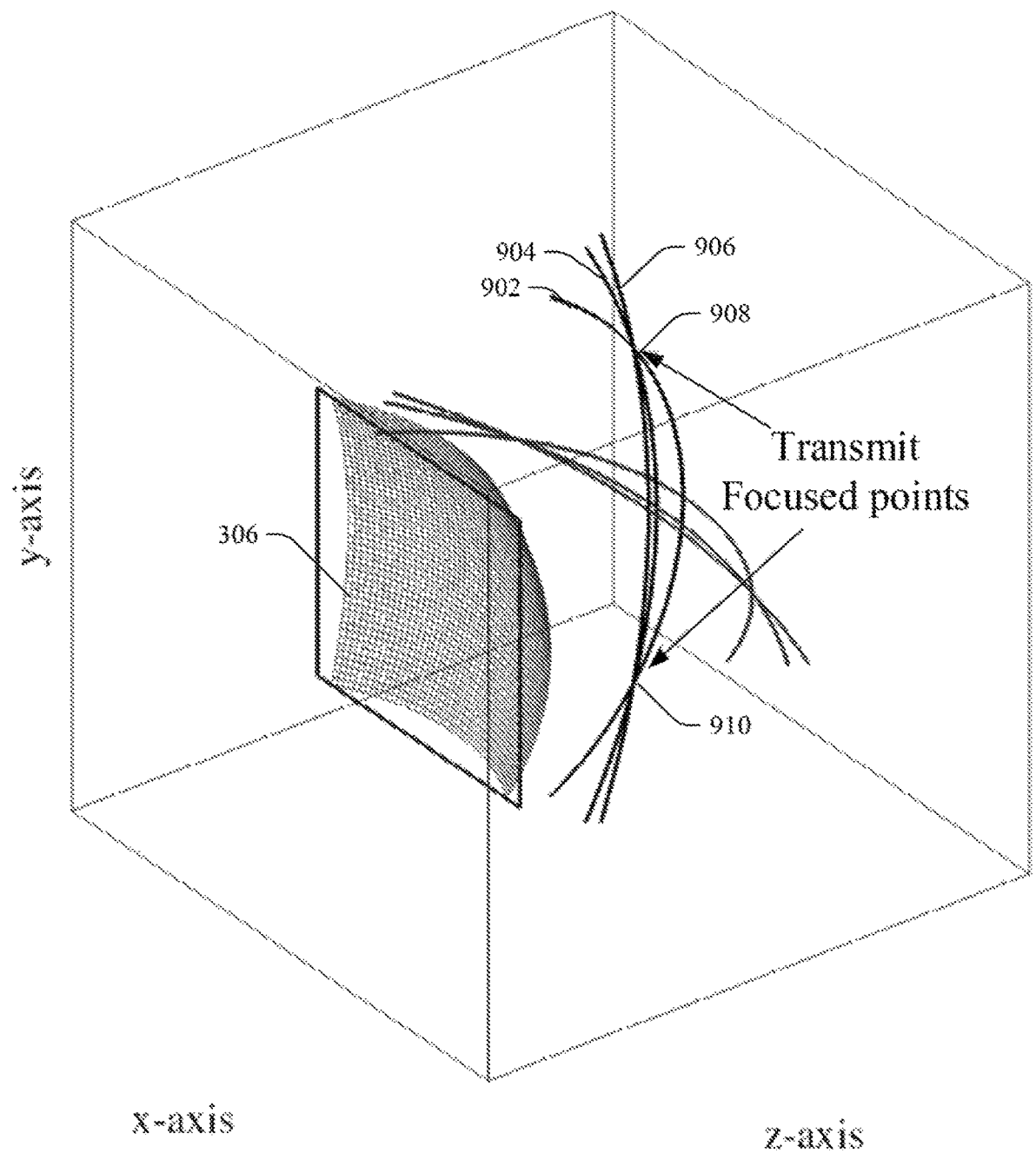
FIG. 9 shows wavefronts that create two focus points using the row-column addressed transducer array with the curved surface.

With the curved surface 306, focusing in transmit direction can be achieved by delaying the wavefronts so that they pass the first point of contact and generate two focus points. This can be seen in FIG. 9, which shows curved lines 902, 904 and 906 and two focus points 908 and 910. This allows for not only focusing in the transmit plane but also in the orthogonal plane. In conventional ultrasound imaging it will be a tedious process to transmit for each steering angle so many times to cover the whole volume. However, this can be done with the approach described herein, e.g., by employing a synthetic aperture imaging (SAI) algorithm, which allows all the delay calculations to be done after data acquisition. Furthermore, since it is possible to focus at any point in the 3-D space both in transmit and in receive separately, two-way focusing can be achieved.

An example beamforming algorithm is described next. The example first explains flat row-column beamforming and then extends this to row-column beamforming for the curved surface 306.

Delay-and-sum (DAS) beamformers usually assume the geometry of the sound sources and receivers to be points. However, by row-column addressing the elements on a 2-D matrix array, each row and column is acoustically equivalent to a line-element. Furthermore, the emitted wavefront of a line-element has the shape of a cylinder, i.e. it is a plane wave in the plane aligned along the line-element and a circle arc in the plane orthogonal to the line-element. Assuming the geometry of the line-elements to be points is therefore a poor approximation. A better approximation assumes the line-elements to be line segments instead of points. At the focal zone where an array of line-elements is focused, the geometry is also a line segment.

Calculating the distances between the line-elements and a given point should therefore be calculated as the distance between a line segment and a point. For beamforming with line-segment virtual sources, the time-of-flight for the sound propagating through the media can be calculated as shown in Equation 1:

$$t_{TOF} = \frac{|r_{fp} - r_{xmt}| \pm d(AB_{fp}, P) + d(CD_{rcv}, P)}{c},$$ Equation 1 where $r_{xmt}$ and $r_{fp}$ are vectors from a center of the 2-D array to a center of each transmit line-element and also to a center of a focal line-segment, P is a position vector of any beamforming point, $AB_{fp}$ is a vector from one end to another end of a focal line-segment, $CD_{rev}$ is a vector from one end to another end of each receive line element, $d(:;:)$ calculates a shortest distance between the point P and each of the transmit or receive line-elements which finds a minimum distance between a point and a line-segment, and $\pm$ refers to whether the point P is in between a focal line-segment and a surface of the transducer, i.e. $-$, or the point P is located after the focal line-segment, i.e. $+$. The minimum distance between the point P and the line segment AB can be calculated as shown in Equation 2:

$$d(AB, P) = \begin{cases} \frac{\|AB \times AP\|}{\|AB\|} & \text{if } 0 \leq \frac{AB \cdot AP}{\|AB\|^2} \leq 1 \\ \|AP\| & \text{if } \frac{AB \cdot AP}{\|AB\|^2} < 0 \\ \|BP\| & \text{if } \frac{AB \cdot AP}{\|AB\|^2} > 1 \end{cases}$$ Equation 2

Figure 10:
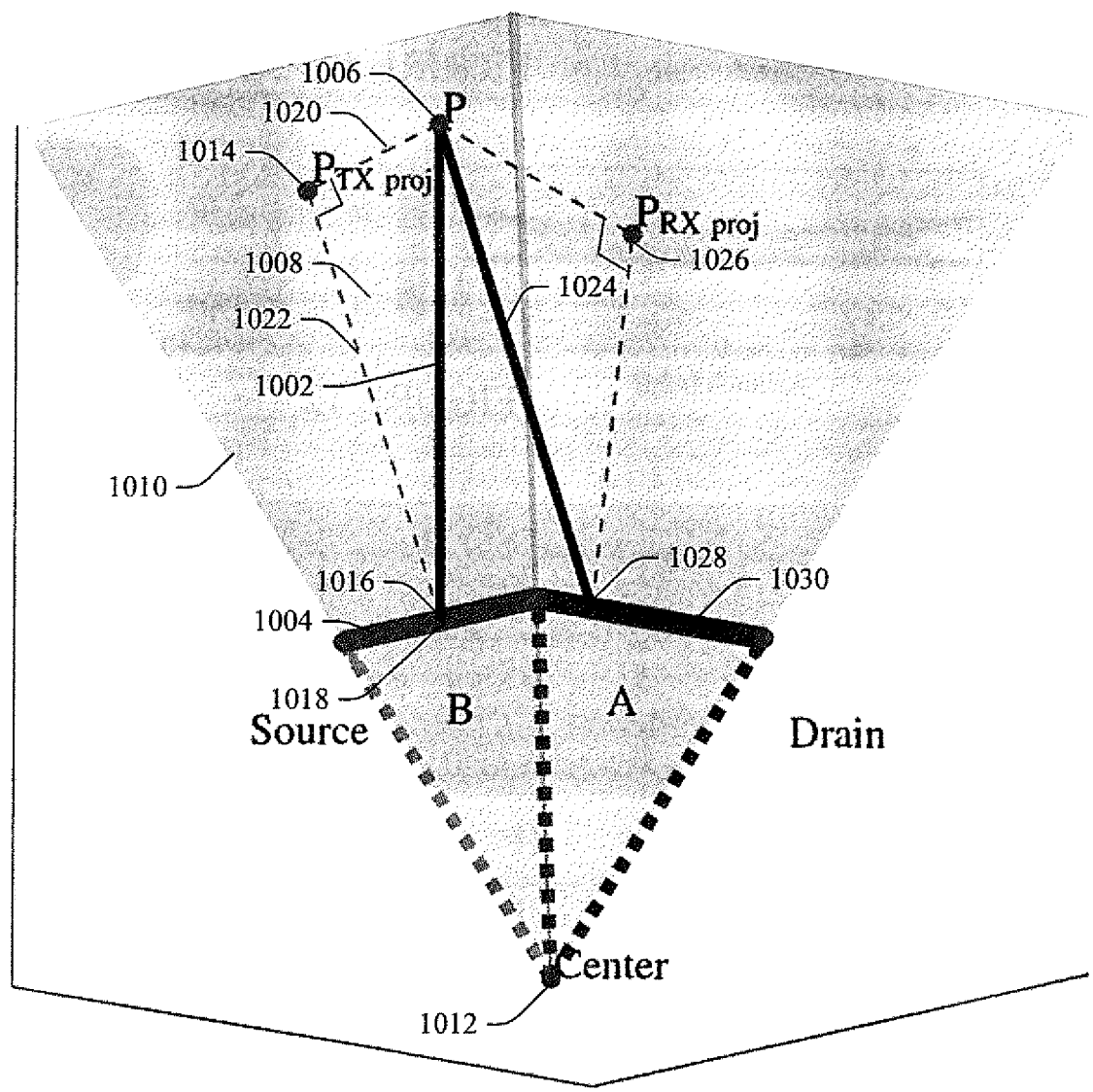
FIG. 10 provides a diagram showing how to extend beamforming to calculate a time-of-flight in dynamic receive focusing with the curved surface for single element transmissions.

FIG. 10 is used to explain how to extend the above to calculate the time-of-flight in dynamic receive focusing with the curved surface 306 for single element transmissions. The curved surface 306 is not shown for sake of clarity, and is located above or on top of the 2-D array 304. A shortest path 1002 from a source line-element 1004 to an imaging point P 1006 is in a plane 1008 that goes through a curved surface center 1012 and the point P 1006 and that is orthogonal to a transmit plane B 1010, which goes through the transmit element 1004 and the curved surface center 1012.

To calculate the distance from the transmit element 1004 to the imaging point P 1006, ($\overline{BP}$), a perpendicular projection $P_{TX_{proj}}$ 1014 of the point P 1006 is located on the plane 1010. An intersection 1016 of the plane B 1008 (which goes through the point P 1006, $P_{TX_{proj}}$ 1014 and the center 1012), with the transmitting element 1004, is identified at a point B 1018. BP is then calculated as shown in Equation 3:

$$\overline{BP} = \sqrt{\overline{BP_{TX_{proj}}}^2 + \overline{P_{TX_{proj}}P}^2},$$ Equation 3 where $\overline{P_{TX_{proj}}P}$ is a line segment from $P_{TX_{proj}}$ 1014 to P 1006, and $BP_{TX_{proj}}$ is a line segment, which is computed by subtracting the vector which is pointing from the center 1012 to the $P_{TX_{proj}}$ 1014 by the radius of the curved surface 306, which is fixed. This approach is also used to calculate $\overline{AP}$ 1024, using a perpendicular projection $P_{RX_{proj}}$ 1026 and a point A 1028 on a receive segment 1030, as shown in Equation 4:

$$\overline{PA} = \sqrt{\overline{AP_{RX_{proj}}}^2 + \overline{P_{RX_{proj}}P}^2}.$$ Equation 4 where $\overline{P_{RX_{proj}}P}$ is a line segment from $P_{RX_{proj}}$ 1014 to the P 1106, and $AP_{RX_{proj}}$ is a line segment, which is computed by subtracting the line segment from the center 1012 to the $P_{RX_{proj}}$ 1026 by the radius of the curved surface 306.

A total distance is computed as shown in Equation 5:

$$\overline{BP} + \overline{PA}.$$ Equation 5:

This is repeated for the other columns of the 2-D array 304 for the point P 1006. The computed shortest distances for all of the columns to the point P 1006 provide the data to beamform the point P 1006. This can be achieved using a synthetic aperture imaging and/or other algorithm. In synthetic transmit aperture imaging, by taking advantage of the superposition theorem, the transmit focus may be synthesized in every location by delaying and summing a plurality of datasets (before or after conventional beamforming) acquired from successive transmissions.

In synthetic transmit aperture imaging with a linear array with N elements, for each image point (r, θ), the A-scan signal is as shown in Equation 6:

$$A_{STA}(r, \theta) = \sum_{n=0}^{N-1} \sum_{m=0}^{N-1} S_{m,n}\left(\frac{2r}{c} - \tau_n - \tau_m\right)$$ Equation 6 where $S_{m,n}$ is the echo signal. The first and second summations correspond to transmit and receive beamforming. $\tau_n$ and $\tau_m$ are beamforming delays for transmit m and receive n element combination shown in Equations 7 and 8:

$$\tau_m = \frac{1}{c}\left(r - \sqrt{x_m^2 - r^2 - 2x_m r \sin\theta_s}\right) \text{ and}$$ Equation 7

$$\tau_n = \frac{1}{c}\left(r - \sqrt{x_n^2 - r^2 - 2x_n r \sin\theta}\right).$$ Equation 8

An example of this is described in Jensen, J. A., Nikolov, S., Gammelmark, K. L., & Pedersen, M. H. (2006), "Synthetic Aperture Ultrasound Imaging. Ultrasonics," 44(SUPPL.), e5-e15, e5-e15. doi:10.1016/j.ultras.2006.07.017. The above shortest distance calculation is repeated for all the points of interest in the field of view or region 706. The points can be inside the planes, outside of the planes and/or on a plane(s).

Figure 11:
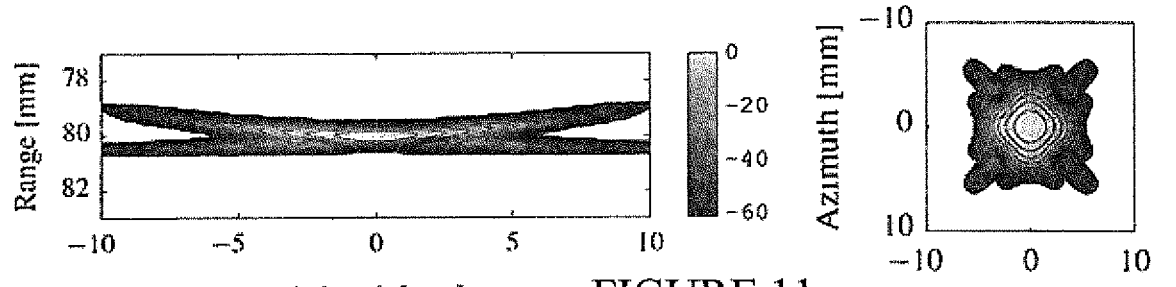
FIG. 11 shows a beamformed B-mode image of a point scatterer imaged with the curved surface as the system's point spread function.
Figure 12:
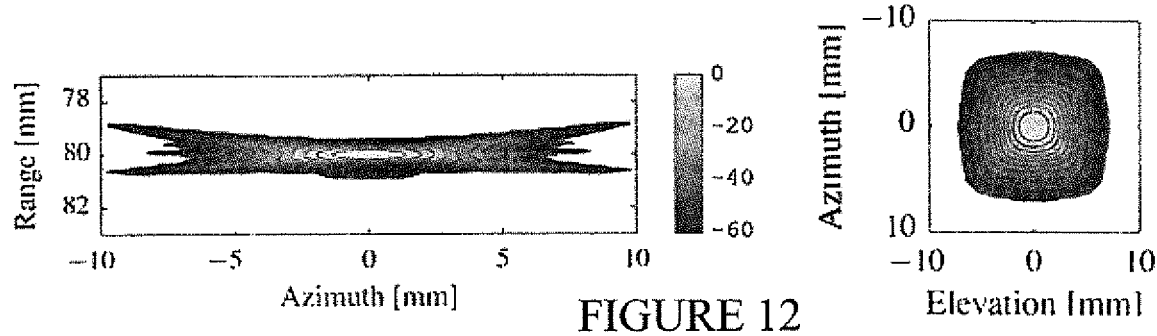
FIG. 12 shows a beamformed B-mode image of a point scatterer imaged without the curved surface as the system's point spread function.

FIGS. 11 and 12 respectively show two beamformed B-mode images of a point scatterer imaged with the curved surface 306 (FIG. 11) and without the curved surface 306 (FIG. 12). The point scatterer is positioned at eighty (80) millimeters (mm) distance from the 2-D array 304. The origin corresponds to the center of the transducer surface. Data was generated using synthetic aperture imaging with 62 single-element transmissions, emitting a 2-cycle sinusoidal excitation pulse with every row of elements at a time and receiving the echoes with all column elements. These figures show how energy falls off with angle and without the curved surface 306.

Figure 13:
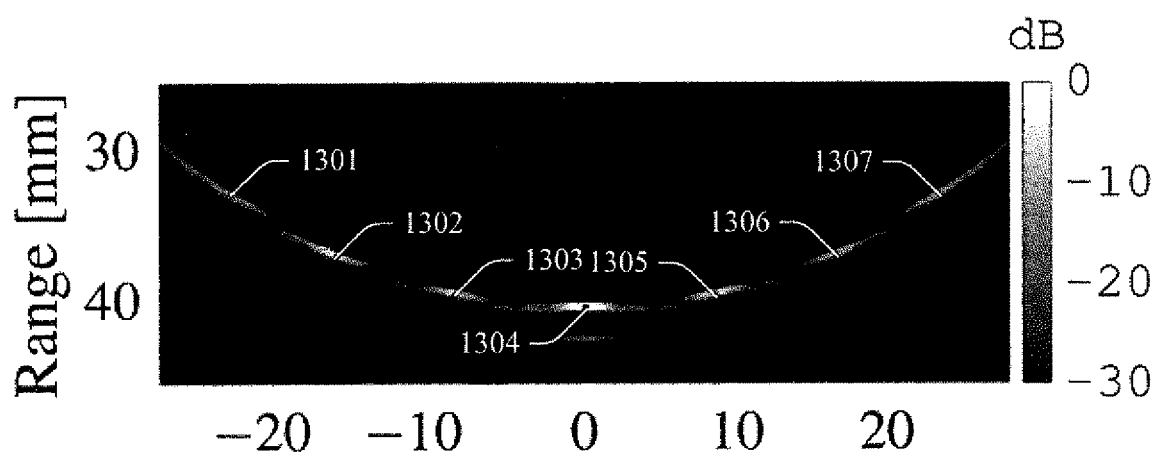
FIG. 13 shows a beamformed B-mode image of point scatterers imaged with the curved surface.
Figure 14:
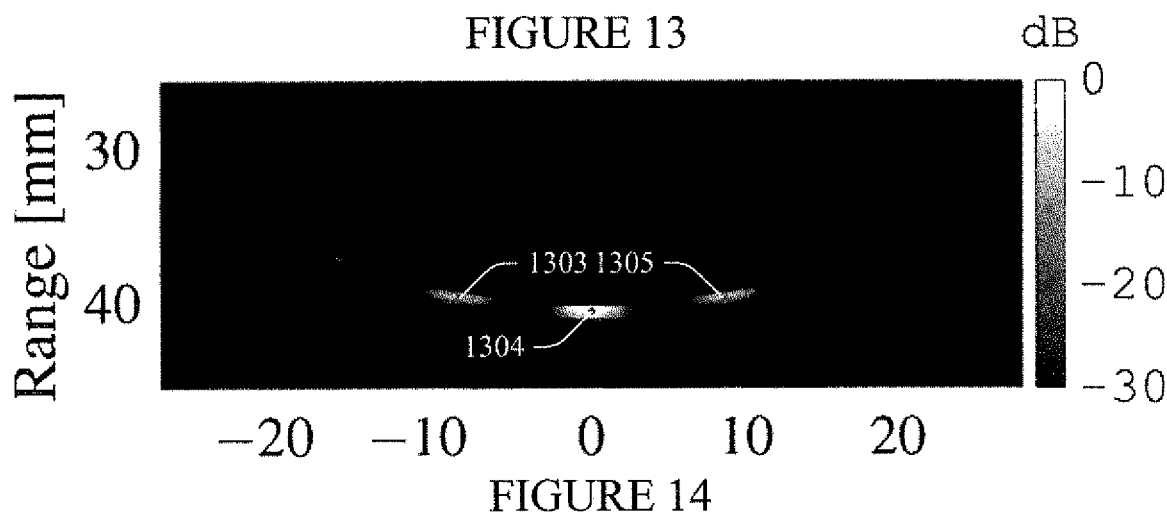
FIG. 14 shows a beamformed B-mode image of point scatterers imaged without the curved surface.

FIGS. 13 and 14 respectively show two beamformed B-mode images for multiple point scatterers imaged with the curved surface 306 (FIG. 13) and without the curved surface 306 (FIG. 14). For these images, seven scatterers 1301, 1302, 1303, 1304, 1305, 1306 and 1307 are positioned at forty (40) mm distance from the 2-D array 304 within ±45° in the elevation plane. One 1-D array includes sixty-two columns, and the other 1-D array includes sixty-two rows. The receive array is rotated 90° with respect to the transmit array. The parameters as shown in Table 1.

TABLE 1

Parameters.

| Parameter name | Notation | Value | Unit |
|---|---|---|---|
| Number of elements | — | 62 + 62 | — |
| Center frequency | $f_0$ | 3.0 | MHz |
| Speed of sound | c | 1480 | m/s |
| Wave length | $\lambda$ | 493.3 | μm |
| Array pitch -x | $d_x$ | $\lambda/2$ = 246.6 | μm |
| Array pitch -y | $d_y$ | $\lambda/2$ = 246.6 | μm |
| Sampling frequency | $f_s$ | 120 | MHz |
| Emission pulse | — | 2-cycles, Hann-weighted | — |
| Lens focal ratio | $f_\#$ | −1 | — |

FIG. 13 shows all of the scatterers 1301, 1302, 1303, 1304, 1305, 1306 and 1307, including those (1301, 1302, 1306 and 1307) beyond the forward-looking region 206, which are in the larger area 706. FIG. 14 shows the scatterers within the forward-looking region 206 of the 2-D array 304, which include scatterers 1303, 1304 and 1305. Using a diverging lens can thus enable imaging a large field of view.

Figure 15:
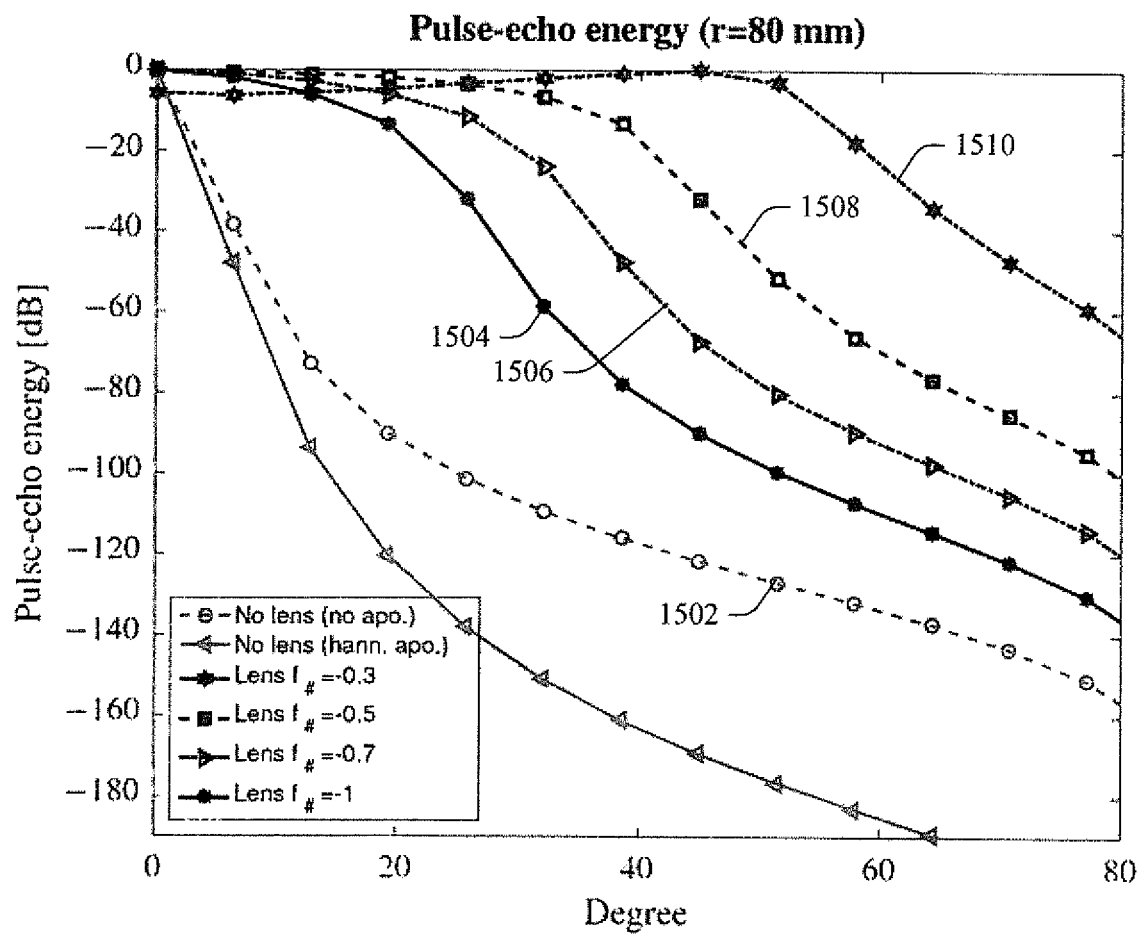
FIG. 15 graphically shows pulse-echo energy as a function of steering angles for different f # s and without the curved surface.

FIG. 15 graphically shows a comparison of the normalized pulse-echo energy as a function of steering angle from center to one side of the array with and without the curved surface 306. The points are located on an arc with radii of eighty (80) millimeters (mm) away from the center of the 2-D array 304 and spanned from 0° to 80°. A curve 1502 shows the pulse-echo energy without the curved surface 306. The curves 1504, 1506, 1508 and 1510 respectively show the pulse-echo energy with the curved surface 306 for a decreasing f #, which shows an increasing imaging region. For example, at −40 dB a lens increases the pulse-echo field-of-view up to 70 degrees for a lens with f #=−0.5.

Figure 16:
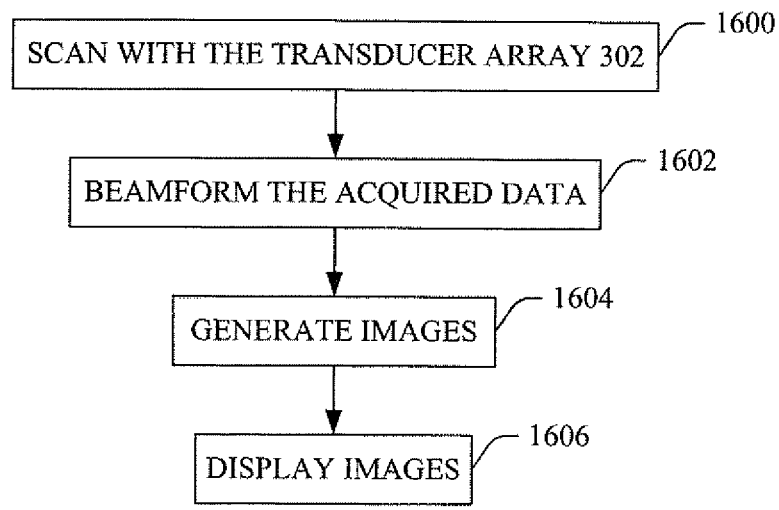
FIG. 16 illustrates an example method in accordance with an embodiment herein.

FIG. 16 illustrates an example method. At 1600, the transducer array 302 is used to scan a subject. As described herein the transducer array 302 includes the row-addressed 2-D array 304 with the curved surface 306. Two-way focusing may be employed. The curved surface 306 may be configured with integrated apodization. At 1602, the acquired data is beamformed as described herein. At 1604, the beamformed data is processed to generate an image. At 1606, the image is displayed.

The functions described herein may be implemented via one or more hardware and/or software computer processors (e.g., a micro-processor, a central processing unit (CPU), etc.) executing one or more computer readable instructions encoded or embodied on computer readable storage medium (which excludes transitory medium) such as physical memory which causes the one or more processors to carry out the various acts and/or other functions and/or acts. Additionally, or alternatively, the one or more processors can execute instructions carried by transitory medium such as a signal or carrier wave.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound imaging system, comprising:
   a transducer array, comprising:
      a row-column addressed 2-D array of transducer elements, wherein the row-column addressed 2-D array comprises:
         a first array of 1-D arrays of elements;
         a second array of 1-D arrays of elements, which is orthogonal to the first array; and
         a double-curved surface;
   transmit circuitry configured to convey an excitation pulse to the transducer array;
   receive circuitry configured to receive a signal indicative of an ultrasound echo from the transducer array;
   a beamformer configured to generate ultrasound image data with the received signal and time-of-flight distances for each of the elements of the transducer elements,
   wherein the beamformer is configured to compute, for each of one of the first array or the second array, a time-of-flight distance from each of the elements to an imaging point P, for all imaging points of interest, as $\overline{BP} + \overline{PA}$, where $\overline{BP} = \sqrt{\overline{BP_{TX_{proj}}}^2 + \overline{P_{TX_{proj}}P}^2}$, $\overline{P_{TX_{proj}}P}$ is a line segment from the imaging point P to a perpendicular projection $P_{TX_{proj}}$ (1014) of the imaging point P and $BP_{TX_{proj}}$ is a line segment computed by subtracting a vector pointing from a curved surface center to the perpendicular projection $P_{TX_{proj}}$ by a fixed radius of the curved surface, and where $\overline{PA} = \sqrt{\overline{AP_{RX_{proj}}}^2 + \overline{P_{RX_{proj}}P}^2}$, $\overline{P_{RX_{proj}}P}$ is a line segment from the imaging point P to a perpendicular projection $P_{RX_{proj}}$ (1026) of the imaging point P and $AP_{TX_{proj}}$ is a line segment computed by subtracting the line segment from the curved surface center to the perpendicular projection $P_{RX_{proj}}$ by the fixed radius of the curved surface; and
   a display configured to display the ultrasound image data.

2. The ultrasound imaging system of claim 1, wherein the double-curved surface is a lens.

3. The ultrasound imaging system of claim 2, wherein the lens is a convex lens.

4. The ultrasound imaging system of claim 3, wherein the convex lens is a spherical lens.

5. The ultrasound imaging system of claim 2, wherein the lens has a same curvature in two orthogonal directions.

6. The ultrasound imaging system of claim 2, wherein the lens has a first curvature in a direction of the first array and a second curvature in a direction of the second array, wherein the first and second curvatures are different.

7. The ultrasound imaging system of claim 2, wherein the lens has a first thickness at a periphery and a second thickness at a center region, and the first thickness is greater than the second thickness.

8. The ultrasound imaging system of claim 2, wherein the lens is centered over the 2-D array.

9. The ultrasound imaging system of claim 2, wherein the lens is disposed off-center with respect to the 2-D array.

10. The ultrasound imaging system of claim 2, wherein the 2-D array has a first imaging region and the combination of the 2-D array and the lens has a second imaging region, and the second imaging region is larger than the first imaging region.

11. The ultrasound imaging system of claim 2, wherein the lens is a Fresnel lens.

12. The ultrasound imaging system of claim 1, wherein the transducer elements include triangular shaped elements that provide integrated apodization that linearly scales an output pressure transmitted by the elements of a periphery and electrical signal generated by the elements of the periphery.

13. The ultrasound imaging system of claim 1, wherein the curved surface is an active transducing surface of the 2-D array.

14. The ultrasound imaging system of claim 1, wherein the 2-D array includes piezoelectric or capacitive micromachined ultrasonic transducer transducing elements.

15. The ultrasound imaging system of claim 1, further comprising:
   a controller configured to control the transmit circuitry for two-way focusing to focus the set of 1-D column array elements or the set of 1-D row array elements.

16. The ultrasound imaging system of claim 1, wherein the beamformer is configured to determine a shortest distance from a source to a point to a drain for each column and each row for a plurality of points in an imaging field of view.

17. The ultrasound imaging system of claim 16, wherein the beamformer sums coherently low resolution beamformed images for a point for all transmissions.

18. The ultrasound imaging system of claim 16, wherein the point is from a group consisting of inside the planes, outside of the planes and on a plane.

19. A method, comprising:
   transmitting an ultrasound signal with a first array of a 2-D row-column addressed transducer array with a curved surface;
   receiving an echo signal with a second array of the 2-D row-column addressed transducer array with the curved surface, where the 2-D row-column addressed transducer array includes transducer elements and the first and second arrays are perpendicular;
   beamforming the echo signal to create ultrasound image data with the received signal and time-of-flight distances for each of the elements of the transducer elements, wherein the beamforming includes computing, for each of one of the first array or the second array, a time-of-flight distance from each of the elements to an imaging point P, for all imaging points of interest, as $\overline{BP}+\overline{PA}$, where $\overline{BP}=\sqrt{\overline{BP_{TX_{proj}}}^2+\overline{P_{TX_{proj}}P}^2}$, $\overline{P_{TX_{proj}}P}$ is a line segment from the imaging point P to a perpendicular projection $P_{TX_{proj}}$ of the imaging point P and $BP_{TX_{proj}}$ is a line segment computed by subtracting a vector pointing from a curved surface center to the perpendicular projection $P_{TX_{proj}}$ by a fixed radius of the curved surface, and where $\overline{PA}=\sqrt{\overline{AP_{RX_{proj}}}^2+\overline{R_{RX_{proj}}P}^2}$, $\overline{P_{RX_{proj}}P}$ is a line segment from the imaging point P to a perpendicular projection $P_{RX_{proj}}$ of the imaging point P and $AP_{TX_{proj}}$ is a line segment computed by subtracting the line segment from the curved surface center to the perpendicular projection $P_{RX_{proj}}$ by the fixed radius of the curved surface; and
   displaying the image.

20. A computer readable medium encoded with computer readable instructions, which when executed cause a processor to:
   transmit an ultrasound signal with a first array of a 2-D row-column addressed transducer array with a curved surface;
   receive an echo signal with a second array of the 2-D row-column addressed transducer array with the curved surface, where the 2-D row-column addressed transducer array includes transducer elements and the first and second arrays are perpendicular;
   beamform the echo signal to create ultrasound image data with the received signal and time-of-flight distances for each of the elements of the transducer elements, wherein the beamforming includes computing, for each of one of the first array or the second array, a time-of-flight distance from each of the elements to an imaging point P, for all imaging points of interest, as $\overline{BP}+\overline{PA}$, where $\overline{BP}=\sqrt{\overline{BP_{TX_{proj}}}^2+\overline{P_{TX_{proj}}P}^2}$, $\overline{P_{TX_{proj}}P}$ is a line segment from the imaging point P to a perpendicular projection $P_{TX_{proj}}$ of the imaging point P and $BP_{TX_{proj}}$ is a line segment computed by subtracting a vector pointing from a curved surface center to the perpendicular projection $P_{TX_{proj}}$ by a fixed radius of the curved surface, and where $\overline{PA}=\sqrt{\overline{AP_{RX_{proj}}}^2+\overline{P_{RX_{proj}}P}^2}$, $\overline{P_{RX_{proj}}P}$ is a line segment from the imaging point P to a perpendicular projection $P_{RX_{proj}}$ of the imaging point P and $AP_{TX_{proj}}$ is a line segment computed by subtracting the line segment from the curved surface center to the perpendicular projection $P_{RX_{proj}}$ by the fixed radius of the curved surface; and
   displaying the image.

\* \* \* \* \*